US006629914B1

(12) United States Patent
Roux

(10) Patent No.: US 6,629,914 B1
(45) Date of Patent: Oct. 7, 2003

(54) DEVICE FOR POSITIONING A PLATE ON A ROLL WITH MAGNETIC FIXING

(75) Inventor: Jean-Pierre Roux, Ardon (FR)

(73) Assignee: Komori-Chambon SA, Orleans (FR)

( * ) Notice: Subject to any disclaimer, the term of this patent is extended or adjusted under 35 U.S.C. 154(b) by 11 days.

(21) Appl. No.: 09/786,558

(22) PCT Filed: Jul. 7, 2000

(86) PCT No.: PCT/FR00/01974

§ 371 (c)(1),
(2), (4) Date: Mar. 7, 2001

(87) PCT Pub. No.: WO01/03894

PCT Pub. Date: Jan. 18, 2001

(30) Foreign Application Priority Data

Jul. 9, 1999 (FR) .......................................... 99 08934

(51) Int. Cl.[7] .............................................. F16C 13/00

(52) U.S. Cl. .......................... 492/45; 492/49; 493/469; 493/471; 493/475

(58) Field of Search ............................... 492/8, 31, 32, 492/10, 16, 21, 45, 49; 493/434, 442, 475, 476, 478, 479, 469, 471; 83/698.21, 698.31, 698.41, 698.51, 346, 343

(56) References Cited

U.S. PATENT DOCUMENTS 1,172,907 A * 2/1916 Rust ........................... 464/184
3,045,323 A * 7/1962 Willingham ................... 38/63
3,670,646 A * 6/1972 Welch, Jr. ................ 101/389.1
3,752,042 A * 8/1973 Castille ...................... 493/471
3,797,351 A * 3/1974 Jones, Jr. ................. 83/699.11
3,824,927 A * 7/1974 Pugh et al. ................. 101/378
3,835,778 A * 9/1974 Bock ....................... 101/415.1
4,020,724 A * 5/1977 Quinlan ....................... 493/60
4,275,543 A * 6/1981 Marchetti ................... 493/183
4,370,787 A * 2/1983 Feldkamper ................. 492/38
4,437,407 A * 3/1984 Wirz et al. .................. 101/409
4,498,527 A * 2/1985 Gerarts et al. ................ 165/89
4,505,015 A * 3/1985 Ross et al. ..................... 492/16
4,759,287 A * 7/1988 Shizuya ...................... 101/248
4,809,609 A * 3/1989 Sugiura et al. .......... 101/401.1
4,823,697 A * 4/1989 Randazzo ................... 101/375
5,186,108 A * 2/1993 Hillebrand ............... 101/415.1
5,189,958 A * 3/1993 Tafel et al. .............. 101/415.1
5,398,609 A * 3/1995 Stiel ........................ 101/415.1
5,497,703 A * 3/1996 Becker ..................... 101/415.1
5,634,406 A * 6/1997 Lindner et al. ............. 101/486
5,642,668 A * 7/1997 Schaede et al. .......... 101/415.1
5,711,223 A * 1/1998 Taylor ..................... 101/389.1

* cited by examiner

*Primary Examiner*—Rinaldi I. Rada
*Assistant Examiner*—Paul Durand
(74) *Attorney, Agent, or Firm*—Young & Thompson

(57) ABSTRACT

The invention concerns a device for positioning a plate (3) on a roll (1), in particular a chopper or folding roll. Said device is characterized in that the roll is provided with magnetic fixing means maintaining the plate on the surface thereof, and two centring elements whereof at least one (9) is mobile and longitudinally spaced apart from the first, so as to cooperate with matching means maintaining the plate (3), the mobile centering element (9) being linked to control means (15) for displacing it along the transverse axis of the roll (1).

11 Claims, 2 Drawing Sheets

DEVICE FOR POSITIONING A PLATE ON A ROLL WITH MAGNETIC FIXING

BACKGROUND OF THE INVENTION

The present invention relates to a device for positioning a chopper plate on roll with magnetic fixing.

The chopping of cardboard blanks principally employs two essential techniques, namely the so-called SK ("Single Knife") process in which the cardboard blank is admitted between two associated rolls, namely a chopper roll and an impression roll, and the so-called TK ("Twin Knife") process in which the cardboard blank is admitted between two chopper rolls, of which the impressions are strictly located one with respect to the other.

These different techniques are used conjointly either with one-piece solid rolls, or with rolls on which segments are added. It is known that these two types of rolls are of relatively high cost and this is why it has been proposed to employ plates which are both covered by the impressions necessary for the formation of the chopping or the marking of fold, and which are fixed on a support roll by various fixation means.

A first means consists, after location and positioning, in welding the plate on the support roll by its two ends. However, such a technique presents the drawback of requiring considerable mechanical means for ensuring the tension and a perfect application of the plate on the support roll.

A second, so-called "fixation of ARK type" means, consists in disposing, on one of the faces of the plate, at each of the longitudinal ends thereof, a parallelepipedic maintaining element, each maintaining element being fitted in a longitudinal groove provided on the surface of the roll. In such a device, the tension is ensured by a system of wedges which tends to bring the two parallelepipedic elements nearer each other. A drawback of this type of technique is that it requires, in order to be efficient, a tension which is constant on the plate and which is distributed equally over the periphery of the roll.

A third means for fixing the plate on the support roll consists in employing magnetic means which are essentially constituted by magnetized bars which are fitted in longitudinal grooves provided on the periphery of the support roll.

The plate maintaining devices of this latter type are inexpensive and easy to use. However, one drawback of this technique is that, once the plate is positioned on the roll, it is no longer possible to proceed with a correction of its positioning, however small. Now a precise positioning, particularly when the chopping is effected by the TK technique, is essential for the correct functioning of the system. This is why such a type of fixation is not used when an extremely precise positioning of the plate on the roll proves necessary.

Concerning the positioning of the chopping impressions in the sense of the longitudinal axis of the roll, it is known that the chopping machines are provided with means ensuring such a displacement of the support rolls so as to compensate any offset in the longitudinal direction. Similarly, the plate support rolls are provided with means ensuring an angular compensation of one roll with respect to the other, particularly by acting on gears ensuring drive thereof.

SUMMARY OF THE INVENTION

The present invention has for its object to propose a means ensuring both the correction of the orientation of a chopping plate in the transverse direction of the roll and the correction of the relative angular positioning of two associated rolls.

The present invention thus has for its object a device for positioning a plate on a roll, in particular a chopper or folding roll, characterized in that the roll is provided on the one hand with magnetic fixing means maintaining the plate on the surface thereof, and on the other hand with two centering elements of which at least one is mobile and longitudinally spaced apart from the first, so as to cooperate with complementary means of the plate, the mobile centering element being linked to control means for displacing it at least along the transverse axis of the roll.

In a first form of embodiment of the invention, the positioning device will comprise a centering element fixed with respect to the roll, so as to ensure an orientation of the major axis of the plate with respect to the transverse axis of the roll.

The present invention also makes it possible, when the two centering elements are mobile elements whose displacement is effected along the transverse axis of the roll, to displace the plate parallel to itself, which amounts to rotating it about the roll, thus ensuring an angular offset of this plate with respect to the plate disposed on the roll associated therewith.

The centering elements will preferably be constituted by studs and the complementary elements will be constituted by orifices provided in the plate. The studs will preferably be constituted by cylindrical elements of circular cross-section. In the case of one of the studs being fixed with respect to the roll, the orifice corresponding to the mobile stud may present a shape elongated in the longitudinal direction of the axis of the roll, its other dimension corresponding strictly to the outer diameter of the stud.

The control means may advantageously be constituted by a lever mounted to pivot about a pin fast with the roll of which one end will comprise a marking element fast with the other side of the plate and which will be adapted to effect an angular displacement under the action of control means disposed at the other end of the lever.

The control means may be constituted by a screw provided with a control knob comprising a vernier for adjustment.

The control means may also be constituted by a system comprising a sloping shim mounted to move substantially in a plane tangential to the roll and inclined with respect to the longitudinal axis thereof, on which shim the mobile centering stud is arranged.

BRIEF DESCRIPTION OF THE DRAWINGS

Forms of embodiment of the present invention will be described hereiinafter by way of non-limiting examples, with reference to the accompanying drawings, in which.

DESCRIPTION OF THE PREFERRED EMBODIMENTS

Figure 1:
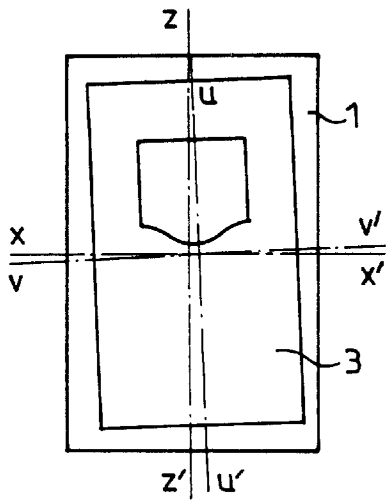
FIG. 1 is a schematic view illustrating the angular offset provoked by a poor positioniong of a plate on a chopper roll.

FIG. 1 shows, in developed form, the outer surface of a chopper roll 1 of longitudinal axis xx' and of a chopper plate 3 which is maintained on the surface of the latter by longitudinal magnets (not shown in the drawing) which are distributed over the periphery of the roll.

Longitudinal axis xx' will denote hereinafter in the present text the axis of rotation of the roll 1, and transverse axis zz' the axis perpendicular to the longitudinal axis xx' when the surface of this roll is unfolded. Furthermore, major axis uu' of the plate 3 will denote the axis of the latter which may be disposed along the transverse axis zz' of the roll, and minor axis vv' the axis of the plate 3 perpendicular to the major axis uu'.

It is thus observed in FIG. 1 that a poor positioning of the plate 3 on the roll 1 leads to an angular offset between the major axis uu' of the plate 3 and the transverse axis zz' of the unfolded upper surface of the roll 1.

The present invention thus proposes to avoid the angular offset and to arrange for the major axis uu' of the plate 3 to be parallel to the transverse axis zz' of the roll 1.

Figure 2:
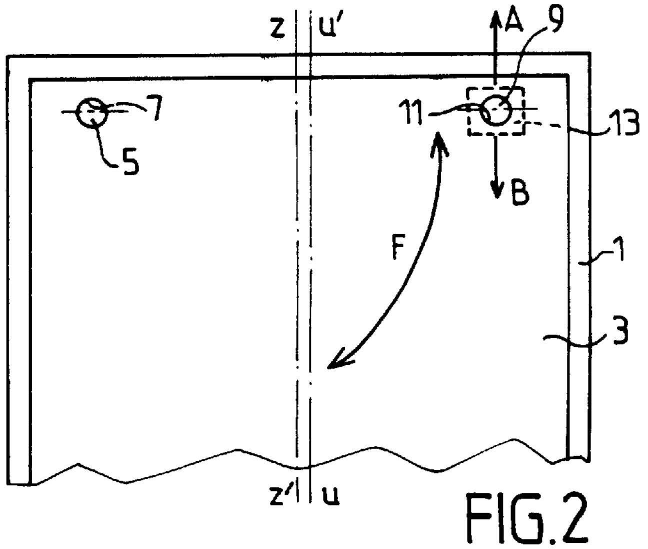
FIG. 2 is a partial schematic view illustrating the principle of carrying out the invention.

To that end, as shown in FIG. 2, a fixed centering stud 5 was disposed or the outer surface of the roll 1, in the vicinity of one of the edges thereof. In the upper part of the plate 3, in a corner thereof corresponding to the stud 5, there was made an orifice 7 perfectly matching the stud 5, and it will therefore be understood that, if the plate 3 is made to rotate in the direction of arrow F about stud 5, it will then be possible to render axes uu' and zz' parallel, as shown in FIG. 2.

In order to effect such a rotation, a second centering stud 9 is arranged on the roll 1 and a corresponding orifice 11 perfectly matching the dimensions of said stud is provided in the plate 3, so that, when the studs 5 and 9 are disposed in the orifices 7 and 11, the plate 3 is perfectly blocked in position with respect to the roll 1. The second stud 9 is disposed on means 13 allowing it to be displaced in the direction of the transverse axis zz' of the roll 1.

Under these conditions, in order to carry out the invention, one will proceed as described hereinafter.

Figure 3:
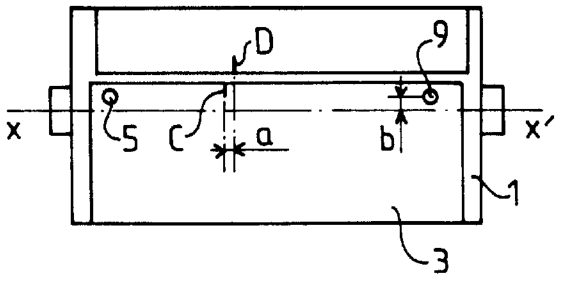
FIG. 3 is a view of a chopper roll coated with its plate and showing the means for monitoring the correct positioning of said plate.

In a first step, the mobile stud 9 will be positioned so that it is, a priori, disposed on a longitudinal axis of the roll 1, i.e. an axis parallel to its central and longitudinal axis xx', passing through the centre of the stud 5, and the plate 3 will be disposed on the roll 1 so that it is held by the two studs 5 and 9. As shown in FIG. 3, the upper part of the plate 3 will comprise a mark C and its lower part will comprise a second mark D, marks C and D lying on a line strictly parallel to the major axis uu' of the plate 3. Once the plate 3 is unfolded and held by the whole of its surface on the roll 1 by the magnetizing means, it is then possible to measure the offset a existing in the direction of the longitudinal axis xx' of the roll, between points C and D. The plate 3 will then be dismantled from the roll 1 and the stud 9 will be displaced along the transverse axis zz' of the roll 1 by an appropriate value b, easily determined by calculation, and making it possible to return the offset a to a zero value. It will then suffice to reposition the plate 3 on the roll 1 so that it is perfectly centred by the studs 5 and 9 in order that, once unfolded on the roll 1, it is in a correct position thereon, i.e. in order that the distance a is zero and therefore its axis uu' is parallel to the transverse axis zz' of the roll 1.

Contrary to the complex devices of the prior state of the art, maintaining of the plate 3 on the roll 1 is ensured, without it being necessary to exert any force of attraction on the plate.

Figure 4:
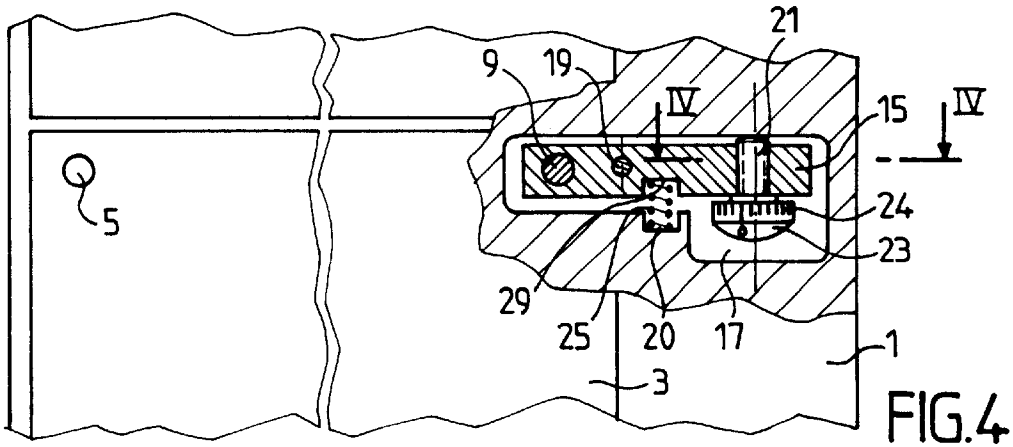
FIG. 4 is a view with partial section showing a chopper plate disposed on a roll and the device ensuring correct positioning of said plate.

FIG. 4 shows a device for effecting, in controlled manner, the required displacement of the stud 9 in the direction of the transverse axis zz' of the roll 1. This device is constituted by a lever 15 which is disposed in a cavity 17 made in the roll 1, and which is mounted to rotate about an axis 19. The inner end of the lever 15 is articulated about the second centering stud 9 intended to cooperate with a fixed centering stud 5 fast with the roll 1, in order to ensure positioning of the plate 3. The opposite outer end of the lever 15 is pierced with a threaded hole in which is positioned a screw 21 whose end comes into abutment against one of the sides bordering the cavity 17 under the action of a spring 25 which abuts, by each of its ends, in respective cavities 20 and 29 provided in the roll 1 and in the lever 15. The other end of the screw 21 is provided with a control head 23. It will be understood that, by the rotation of the screw 21, the rotation of the lever 15 about axis 19 is ensured and, consequently, the displacement of the centering stud 9 in the transverse direction zz' of the roll 1. The distance existing between the centre of the centering stud 9 and the centre of the axis of rotation 19 will be arranged to be great having regard to the desired displacement of the centering stud 9 along axis zz' of the roll 1.

So as to obtain good precision of adjustment, a portion of the head 23 of the screw 21 may be provided with a vernier 24.

Interestingly, this vernier 24 may comprise graduations which correspond to the value b of the displacement in the direction of axis zz' which it is desired to apply to the stud 9. It is also possible, which simplifies the role of the adjuster, to graduate the vernier 24 with a graduation corresponding directly to the value a constituting the offset in the longitudinal sense xx' of the roll 1, of the two marks C and D. In this way, the user, in order to effect his correction, will only have to make the measurement of the value a and to plot it on the vernier 24 of the knob for controlling the screw 21.

The present invention is particularly interesting in that it makes it possible to combine the simplicity of the mode of fixation with the repetitive nature of the adjustment, so that it is possible to note on each of the plates 3 the value of the offset to be adjusted on the vernier 24, in order, without prior operation, to ensure a correct positioning thereof It is thus possible for the user to pass particularly rapidly from one plate 3 to another as a function of his needs.

Figure 4A:
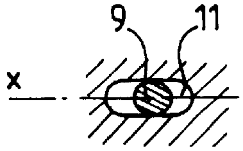
FIG. 4*a* is a view in tangential section with respect to the roll, of a mode of maintaining the plate by a stud fast therewith.

In order to facilitate positioning of the plate 3, it is possible to give the orifice intended to receive the mobile stud 9 a shape elongated in the longitudinal direction of the axis xx' of the roll. In this form of embodiment, the width of the slot 11', as shown in FIG. 4*a*, will be equal to the diameter of the centering stud 9.

Figure 4B:
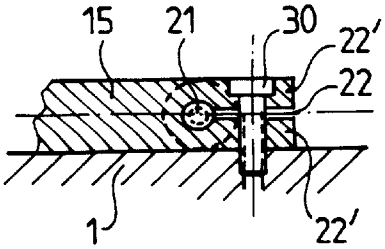
FIG. 4*b* is a view in section along line IV—IV of FIG. 4, of a variant embodiment of the invention.

As shown in FIG. 4*b*, it might, of course, be possible, in the embodiment of FIG. 4, to ensure an immobilization of the adjustment made by making, at the end of the lever 15 bearing the adjusting screw 21, a slot 22 rendering this end supple, and bringing together the two lips 22' thus constituted, by means of a fastening screw 30 screwed in the roll 1.

According to the invention, any other means for ensuring a controlled displacement of the centering stud 9 in the transverse direction zz' of the roll 1 might be employed.

Figure 5:
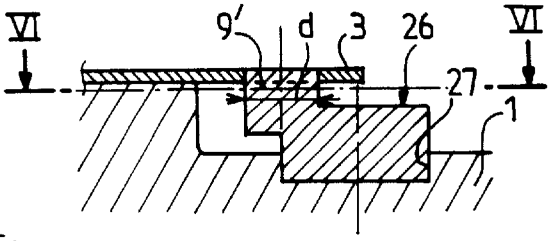
FIG. 5 is a view in partial radial section of a variant embodiment of a plate positioning device according to the invention.
Figure 6:
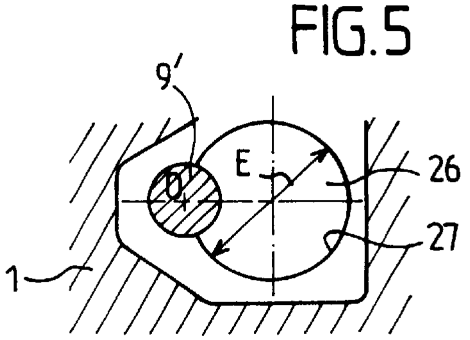
FIG. 6 is a schematic view in section of the device shown in FIG. 5 along line VI—VI thereof.

As shown in FIGS. 5 and 6, it might thus be possible to dispose the mobile centering stud 9' in eccentric manner on a pin 26 of larger diameter E, this latter being mounted to rotate in a housing 27 provided in the roll 1. Of course, the diameter E of the pin 26 will be large with respect to the diameter d of the centering stud 9', so that the displacement of the center O of the stud 9' in the longitudinal direction is negligible with respect to the required displacement of this same centre O along the transverse axis zz' of the roll 1. Once placed in the required position, the centering stud 9' will be immobilized by a blocking of the pin 26 in rotation by any appropriate means.

Figure 7:
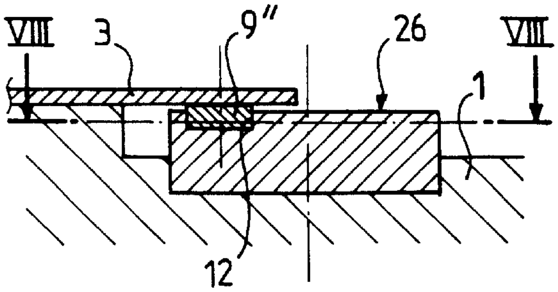
FIGS. 7 and 8 schematically show a variant of the embodiment shown in FIGS. 5 and 6.
Figure 8:
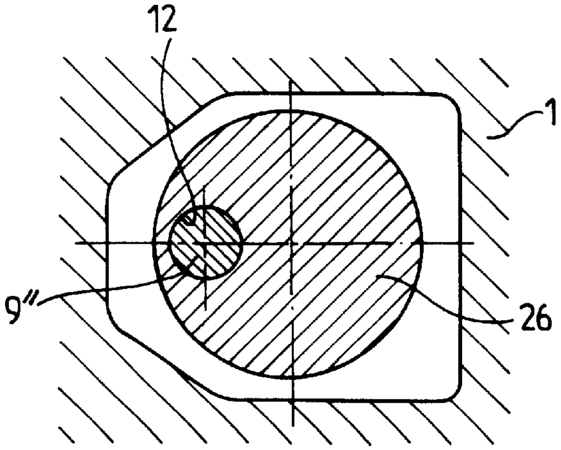

Of course, it might also be possible according to the invention to kinematically invert the centering studs provided on the roll 1 and the orifices provided in the plate. In this way, as schematically shown in FIGS. 7 and 8, the plate 3 is provided with a tenon 9" which is positioned in an orifice 12 provided on the upper surface of the pin 26. Similarly, the fixed stud 5 will be disposed on the plate 3 and the corresponding orifice will be hollowed in the roll 1.

Figure 9:
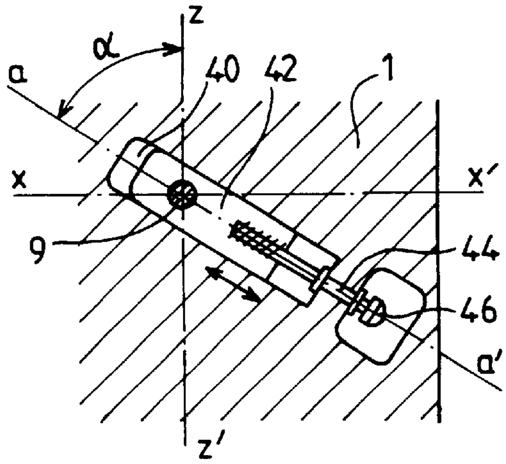
FIG. 9 is a view in partial section of an embodiment allowing a transverse displacement of a mobile centering stud.

According to the invention, it might also be possible, in order to displace the mobile stud 9 along the transverse axis zz' of the roll 1, to replace the lever by a slide-block system, as shown in FIG. 9. In this Figure, the outer surface of the roll 1 has a groove 40 hollowed out therein, whose axis aa' is inclined by an angle $\alpha$ with respect to the transverse direction zz' of the roll 1. This groove 40 receives a slide block 42 which is mobile in translation therein under the action of a screw 44 which is screwed in the slide block 42 and which is immobilized in translation with respect to the roll 1 and mobile in rotation with respect thereto. Under these conditions, it will be understood that any movement of rotation communicated to the screw 44 by a control member 46 disposed at the end thereof has the effect of displacing the stud 9 along axis aa', for example by a length 1, and to that displacement there corresponds a displacement along the transverse axis zz' equal to 1 cos $\alpha$. In such a form of embodiment, an orifice for receiving the stud 9 of elongated shape as shown in FIG. 4*a* will be used.

Figure 10:
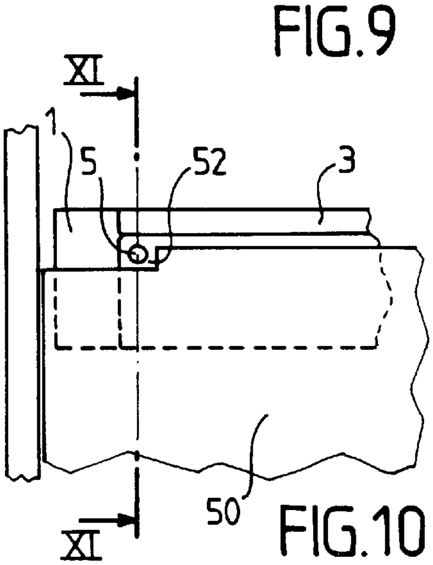
FIG. 10 is a partial view in elevation of a roll and of a device assisting the positioning of the plate thereon.
Figure 11:
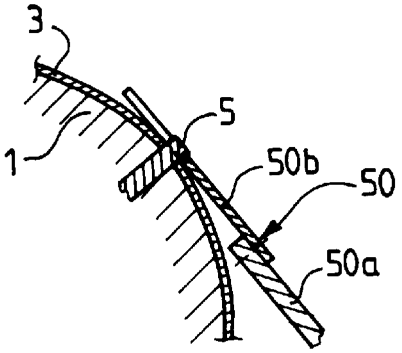
FIG. 11 is an enlarged view in partial section of the device shown in FIG. 10 along line XI—XI thereof.
Figure 12:
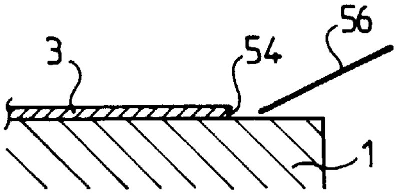
FIG. 12 is a radial partial sectional view along the axis of a roll of a variant embodiment of the invention.

In a particularly interesting form of embodiment of the invention, means are provided for assisting positioning and withdrawal of the plate 3. As shown in FIGS. 10 and 11, these means are essentially constituted by a flat positioning plate 50 constituted by a non-magnetic material, which is in a position to be disposed with the aid of means (not shown in the drawing) so that its lower face is substantially tangential to the outer surface of the roll 1. As shown in FIG. 10, the upper corners of the positioning plate 50 are preferably provided with notches 52 intended to disengage the studs 5, 9 which ensure maintenance of the plate 3. Such an arrangement allows the user easily to position the orifice 7 of the plate 3 on the fixed stud 5 fast with the roll 1 since, under these conditions, the effect of magnetization provoked by the magnetic elements embedded in the roll 1 is exerted on the plate only by the reduced surface thereof disengaged by the notch 52. Thanks to the positioning plate 50, the user may thus easily make the plate 3 pivot in order to position the second free orifice in the mobile stud 9.

As shown in FIG. 11, the positioning plate 50 may be constituted by two elements, namely a rigid, thick support element 50*a* and a thinner element 50*b* of smaller thickness than stud 5.

Of course, such a plate will be used for positioning each of the associated rolls, for example a chopper roll and its impression roll.

Such a plate also facilitates withdrawal of the plate 3.

In order to facilitate the grip, necessary for withdrawing the plate 3 from the roll 1, one of the lower corners of the latter will preferably be cut so as to present a bevel 54. In order to grip it, the user may thus slide a metal spatula 56 in the corner formed by the bevel 54 and the upper surface of the roll 1 so as to be able to detach the plate 3 from the surface of the latter.

As mentioned beforehand, the present invention also ensures the correction of relative angular positioning of two plates disposed on two associated rolls, such as a chopper roll and its impression roll. To that end, at least one of the two rolls will use two mobile studs 9 adjustable along the transverse axis zz' of the roll. In effect, if desired, this arrangement makes it possible to displace the two studs parallel to this transverse axis zz', i.e. to rotate the plate with respect to the roll while maintaining it parallel to itself.

The present invention also makes it possible, with the same device, to correct both the relative angular positioning of two associated rolls and to effect the correction of orientation of the plate by giving each of the two mobile studs 9 displaced in the transverse direction zz' of the roll, different displacements.

What is claimed is:

1. Device for positioning a plate on a roll, wherein the roll comprises a magnetic fixing means maintaining the plate on the surface of the roll, and two centering elements at least one of the centering elements is mobile and longitudinally spaced apart from another one of the centering elements, wherein the plate comprises complementary centering elements that cooperate with the two centering elements of the roll, the mobile centering element being linked to a lever mounted to rotate about a pin connected to the roll for displacing the mobile centering element at least along a transverse axis of the roll, the mobile centering element being disposed at a first end of said lever and a screw for transversely displacing the lever with respect to the roll being at a second end of the lever, and wherein said screw has a first end that abuts on a part of the roll under the action of a compression spring, the compression spring having first and second ends that abut respectively on the roll and on the lever.

2. Device according to claim 1, wherein one of said two centering elements is fixed with respect to the roll.

3. Device according to claim 1, wherein the two centering elements are studs and the complementary elements are orifices in the plate.

4. Device according to claim 1, further comprising a fastening means which ensure fixation of the screw.

5. Device according to claim 1, wherein the plate comprises at least on upper and lower sides respective locating marks which are disposed along an axis parallel to a major axis of the plate.

6. Device according to claim 5, wherein the control means comprise a vernier, graduations of the vernier correspond to a distance between the locating marks.

7. Device according to claim 1, further comprising at least one removable positioning plate made of a non-magnetic material, disposed substantially tangentially to the roll in order to ensure guiding of the plate with respect to the roll.

8. Device according to claim 7, wherein upper corners of the positioning plate comprise a notch for disengaging the two centering elements.

9. Device for positioning a plate on a roll, wherein the roll comprises a magnetic fixing means maintaining the plate on the surface of the roll, and two centering elements at least one of the centering elements is mobile and longitudinally spaced apart from another one of the centering elements, and wherein the plate comprises complementary centering elements that cooperate with the two centering elements of the roll, the mobile centering element being linked to a pin that is mounted to rotate in a housing in the roll for displacing the mobile centering element at least along a transverse axis of the roll, the mobile centering element being disposed in eccentric manner on said pin.

10. A device for positioning a plate on a roll, wherein the roll comprises a magnetic fixing means maintaining the plate on the surface of the roll, and two centering elements at least one of the centering elements is mobile and longitudinally spaced apart from another one of the centering elements, and wherein the plate comprises complementary centering elements that cooperate with the two centering elements of the roll, the mobile centering element being linked to a lever mounted rotatably about a pin connected to the roll, the mobile centering element being disposed at a first end of said lever and a screw being at a second end of said lever, said screw bearing on a portion of the roll under an action of a resilient member.

11. The device according to claim 10, wherein the resilient member is a compression spring having a first end bearing on the cylinder and a second end bearing on the lever.

* * * * *